US006940824B2

(12) United States Patent
Shibutani

(10) Patent No.: US 6,940,824 B2
(45) Date of Patent: Sep. 6, 2005

(54) SLOT ASSIGNMENT ALGORITHM

(75) Inventor: Akira Shibutani, Sunnyvale, CA (US)

(73) Assignee: NTT DoCoMo, Inc., Tokyo (JP)

(*) Notice: Subject to any disclaimer, the term of this patent is extended or adjusted under 35 U.S.C. 154(b) by 867 days.

(21) Appl. No.: 09/826,671

(22) Filed: Apr. 5, 2001

(65) Prior Publication Data

US 2003/0002518 A1 Jan. 2, 2003

(51) Int. Cl.$^7$ ................................................ H04Q 7/20
(52) U.S. Cl. ...................... 370/252; 370/329; 370/468; 455/452.2
(58) Field of Search ................................. 370/252, 329, 370/465, 468; 455/450, 452.1, 452.2

(56) References Cited

U.S. PATENT DOCUMENTS

| 5,914,950 | A | | 6/1999 | Tiedernann, Jr. et al. |
| 6,587,443 | B1 | * | 7/2003 | Dutta ........................... 370/322 |
| 2002/0193133 | A1 | * | 12/2002 | Shibutani ..................... 455/522 |

FOREIGN PATENT DOCUMENTS

| EP | 0 975 190 A2 | 1/2000 |
| EP | 0 986 282 A1 | 3/2000 |
| JP | 2000-059400 A | 2/2000 |
| JP | 2003-508992 A | 3/2003 |
| WO | WO 99/09779 A1 | 2/1999 |
| WO | WO 01/17311 A1 | 3/2001 |

OTHER PUBLICATIONS

F. Adachi et al., "Wideband DS–CDMA for Next–Generation Mobile Communications Systems", IEEE Communication Magazine, vol. 36, pp. 56–69, Sep. 1998.

3$^{rd}$ Generation Partnership Project 2, "cdma 2000 High Rate Packet Data Air Interface Specification", 3GPP2 C.S0024, Sep. 12, 2000.

A. Jalali et al., "Data Throughput of CDMA–HDR a High Efficiency–High Data Rate Personal Communication Wireless System", IEEE VTC2000–Spring, pp. 1854–1858, Tokyo, May 2000.

T. Ue et al., "Symbol Rate and Modulation Level–Controlled Adaptive Modulation/TDMA/TDD System for Personal Communication Systems", IEEE Vehicular Technology Conference 0098–3551, vol. 45/V1, pp. 306–310, Jul. 1995.

S. Sampei et al., "Adaptive Modulation/TDMA Scheme for Large Capacity Personal Multi–Media Communication Systems", IEICE Trans. Commun., vol. E77–B, No. 9, Sep. 1994.

A. Yamaguchi et al., "Forwardlink Packet Scheduler for Packet Data System", IEICE General Conference, Mar. 26–29, 2001.

A. Fujiwara et al., "Link Adaptation Method Using Fading Frequency for High–Speed Packet Transmission with Adaptive Modulation and Coding Scheme in DS–CDMA Mobile Radio", IEICE, The 2000 Communications Society Conference, B–5–79, p. 367, Sep. 30–Oct. 3, 2000.

(Continued)

Primary Examiner—Melvin Marcelo
(74) Attorney, Agent, or Firm—Brinks Hofer Gilson & Lione

(57) ABSTRACT

The present invention provides scheduling algorithms that guarantee minimum data transport service for even ATs with poor channel conditions. Data-requesting ATs are divided into a number ($N_{g1}$) of AT groups according to their channel conditions. Also, a recurring sequence of time slots is defined on the TDMA channel and partitioned into a number ($N_{g2}$) of slot groups, where $N_{g2}$ is made larger than $N_{g1}$. Generally, slot assignment according to the present invention is a two-step process. First, in the sequence, the slot groups are allocated to the AT groups so that AT groups with better channel conditions will receive more slot groups while each AT group will receive at least one slot group. Second, in each AT group, the time slots allocated to an AT group are assigned to the individual ATs in the group. By assigning more slot groups to AT groups with better channel conditions, the algorithm will optimize the overall data throughput. By assigning at least one slot group to each AT groups, the algorithm will guarantee minimum service to ATs with poor channel conditions.

20 Claims, 16 Drawing Sheets

| AT No. | Measured SIR (dB) | | | Group | Assigned slot | |
|---|---|---|---|---|---|---|
| | $\overline{SIR_{(t-1)}}$ | $SIR_{(t)}$ | $0.1 \times SIR_{(t)} + 0.9 \times \overline{SIR_{(t-1)}}$ | | | |
| 5 | 21.1 | 10 | 20 | I | 2 slots / 4 slots | |
| 6 | 20 | 20 | 20 | | | |
| 1 | 14.4 | 20 | 15 | | | TH: 14dB |
| 3 | 12.7 | 15 | 13 | II | 1 slot / 4 slots | |
| 7 | 10.5 | 5 | 10 | | | |
| 4 | 8.33 | 15 | 9 | | | TH: 7dB |
| 2 | 6 | 26 | 8 | III | 1 slot / 4 slots | |
| 8 | 3.0 | 3 | 3 | | | |
| 9 | 1.88 | 3 | 2 | | | |

OTHER PUBLICATIONS

K. Higuchi et al., "Throughput Performance of High–Speed Packet Transmission Using Multi–Level Mudolation in W–CDMA Forward Link", IEICE, The 2000 Communications Society Conference, SB–11–7, pp. 531–532, Sep. 30–Oct. 3, 2000.

N. Kinoshita et al., "Field Experiments on 16QAM/TDMA and Trellis Coded 16QAM/TDMA Systems for Digital Land Mobile Radio Communications", IEICE Trans. Commun., vol. E77–B, No. 7, Jul. 1994.

* cited by examiner

Fig. 10

| AT No. | Measured SIR (dB) | | | Group | Assigned slot |
|---|---|---|---|---|---|
| | $\overline{SIR_{(i-1)}}$ | $SIR_{(i)}$ | $0.1 \times SIR_{(i)} + 0.9 \times \overline{SIR_{(i-1)}}$ | | |
| 5 | 21.1 | 10 | 20 | I | 2 slots / 4 slots |
| 6 | 20 | 20 | 20 | | |
| 1 | 14.4 | 20 | 15 | II | 1 slot / 4 slots |
| 3 | 12.7 | 15 | 13 | | |
| 7 | 10.5 | 5 | 10 | | |
| 4 | 8.33 | 15 | 9 | | |
| 2 | 6 | 26 | 8 | III | 1 slot / 4 slots |
| 8 | 3.0 | 3 | 3 | | |
| 9 | 1.88 | 3 | 2 | | |

| AT No. | DRC (1-6) | | | Group | Assigned slot | |
|---|---|---|---|---|---|---|
| | $\overline{DRC_{(i-1)}}$ | $DRC_{(i)}$ | $0.1 \times DRC_{(i)} + 0.9 \times DRC_{(i-1)}$ | | | |
| 5 | 6 | 6 | 6 | I | 2 slots / 4 slots | DRC = 4, 5 and 6 |
| 6 | 6 | 5 | 6 | | | |
| 1 | 4 | 6 | 4 | | | |
| 3 | 3 | 4 | 3 | II | 1 slot / 4 slots | DRC = 2 and 3 |
| 7 | 2 | 4 | 2 | | | |
| 4 | 2 | 3 | 2 | | | |
| 2 | 1 | 2 | 1 | III | 1 slot / 4 slots | DRC = 1 |
| 8 | 1 | 1 | 1 | | | |
| 9 | 1 | 1 | 1 | | | |

SLOT ASSIGNMENT ALGORITHM

BACKGROUND OF THE INVENTION

This invention relates generally to the field of wireless digital communication systems and, more particularly, to wireless digital communication systems that support adaptive modulation and coding schemes.

Wireless communication systems, such as cellular, use a wireless link comprised of a modulated radio frequency (RF) signal to transmit data between sender and receiver. Since RF bandwidth is a scarce resource, various signal processing techniques have been developed for increasing efficiency of the usage of the available RF bandwidth. An example of such signal processing techniques is the IS-95 promulgated by the telecommunication industry association (TIA). The IS-95 standard, used primarily within cellular telecommunications systems, incorporates code division multiple access (CDMA) to carry out multiple communications simultaneously over the same bandwidth. In accordance with the IS-95 standard, data is transmitted over a RF link at a maximum data rate of 9.6 or 14.4 kbps for voice codec, or 64 kbps for data communication, depending on which rate set from a set of data rates is selected. Such data rates as specified by IS-95 may be suited for wireless cellular telephone systems if the typical communication involves the transmission of digitized voice or lower rate digital data such a facsimile.

The International Telecommunication Union (ITU) of the Internet Society, the recognized authority for worldwide data network standards, has recently published its International Mobile Telecommunications-2000 (IMT-2000) standard. The standard proposes so-called third generation (3G) and beyond (i.e., 3.5G, 4G etc.) data networks that include extensive mobile access by wireless, mobile nodes including cellular phones, personal digital assistants (PDAs), handheld computers, and the like. (See http://www.itu.int). The IMT-2000 standard adopts wideband direct sequence code division multiple access (W-CDMA) as a wireless access method for the proposed third generation and beyond networks and requires a maximum data rate of 144 kbps (vehicular), 384 kbps (pedestrian) or 2 Mbps (quasi-stational), depending on the environment in which wireless communication is carried out. Thus, in communication networks according to the IMT-2000 standard, communication services that require high data transmission rates, such as the multimedia communication service, are indeed feasible over RF links.

The recent phenomenal growth of Information Technology and the Internet creates a need for a high performance wireless Internet technology and has in fact promoted development of various data transmission technologies for wireless data services. One such technology is the adaptive data rate scheme in which a data rate is adaptively changed according to the receiver's RF link condition. One of the key requirements for wireless Internet is to maximize the data throughput in a given cell or sector. The adaptive data rate scheme optimizes data throughput on average by serving multiple data receivers simultaneously at maximum data rates that the receivers can accept given their RF link conditions.

The adaptive data rate scheme is a unique technology in many aspects. Recognizing the characteristics peculiar to data services, such as traffic asymmetry and high tolerance to latency, the adaptive data rate scheme decouples data service from voice service. Two-way conversational speech requires strict adherence to symmetry on the downlink (forward link) and uplink (reverse link) traffic and is very delay sensitive. For instance, latencies above 100 ms are intolerable and make speeches unintelligible. It is also true that a relatively modest data rate is sufficient for high quality voice service. On the other hand, data services are characterized by heavy downlink traffic and light uplink traffic and have high tolerance to latency. For high-speed data downlinked at 1 Mbps, for example, 100 ms represents just 100 kb or 12.5 kbytes, and even latencies of a couple of seconds are hardly noticeable. The decoupling of voice and data services reduces design complexities of Physical Layer because it is relieved from difficult system load-balancing tasks, such as one for determining whether voice or data calls have higher priority.

To serve multiple receivers simultaneously at different data rates, the adaptive data rate scheme is usually implemented with time division multiple access (TDMA) scheme. TDMA scheme subdivides the available frequency band into one or several RF channels called "frames." The frames are further divided into a number of physical channels called "time slots." The adaptive data rate scheme takes advantage of the characteristics of the TDMA channel that data rate control is possible on each slot. Implementation of the adaptive data rate scheme requires measurement of a RF channel condition and determination of a maximum data rate that the RF channel can accept. For this and other useful purposes, at least one pilot burst is inserted into each time slot. Upon reception of the first pilot burst in each time slot, a receiver estimates the downlink channel condition and computes the maximum data rate that the estimated channel condition can support while maintaining a low error rate. The receiver then reports the calculated data rate to the sender. In order to transmit data to the receiver at the reported data rate, the sender selects a modulation scheme and a coding rate that can achieve data transmission at the reported data rate.

When there are multiple receivers requesting data, the sender needs to have a scheduling functionality (a scheduler) that determines the order in which the receivers are served. Various scheduling algorithms have been proposed and used, yet no algorithms have yet been standardized. Basically, these conventional algorithms try to achieve the same goal, i.e., maximizing the average data throughput. To achieve the goal, these algorithms are designed to serve receivers with better channel conditions more favorably. Thus, under these conventional algorithms, receivers with good channel condition are served first, and receivers with poor channel condition are served later. Also, while serving a receiver, if the receiver's channel condition deteriorates, some of these conventional algorithms stop serving the receiver and start serving another receiver with good channel condition to increase the average data throughput. FIG. 1 shows a simplified graphical representation showing implementation of the adaptive data rate scheme. In FIG. 1, an access point (AP) 1 has three sets of data ready to be transmitted to three access terminals (AT) 2, 3 and 4, respectively. The ATs 2–4 have already measured their RF channel conditions based on the received pilot bursts and sent the AP 1 data rates that they can accept. Suppose that the AT 2 has the best channel condition among them, the AT 3 has the next best condition and the AT 4 is the last. Accordingly, the AT 2 is requesting the highest data rate among them, the AT 3 is requesting a lower data rate and the AT 4 is requesting the lowest data rate. According to the above conventional scheduling algorithms, the AT 2 is served first, the AT 3 is next, and the AT 4 is last as shown in FIG. 1.

Other conventional scheduling algorithms are designed to serve ATs favorably whose channel conditions have recently improved. These algorithms assume that a drop in channel conditions is temporary, and stop serving ATs whose channel conditions just dropped until the channel conditions recover. More specifically, these algorithms send data to an AT that has the highest DRC/R, where DRC is the data rate requested by the AT in a given slot, and R is the average rate received by the AT.

It will however be apparent to those skilled in the art that the above conventional scheduling algorithms are nothing but unfair to ATs with poor channel conditions. It may work satisfactorily if a relatively few number of ATs are requesting data. However, in a situation where a large number of ATs frequently request data, these algorithms will be busy serving those with good channel conditions, and those with poor channel conditions will be left unserved until their channel conditions improve. In other words, in a situation where a large number of ATs frequently request data, the algorithms provide discriminating service under which ATs are served only when their channel conditions are good.

BRIEF SUMMARY OF THE INVENTION

The present invention provides scheduling algorithms that guarantee minimum data transport service for even ATs with poor channel conditions. In the present invention, data-requesting ATs are divided into a number of AT groups according to their channel conditions. Also, a recurring sequence of time slots is defined on the TDMA channel and partitioned into a number of slot groups, where the number of slot groups is made larger than the number of AT groups. Slot assignment according to the present invention is a two-step process. First, in each sequence, the slot groups are assigned to the AT groups so that AT groups with better channel conditions will receive more slot groups. Second, in each AT group, the time slots assigned to the AT group are assigned to the individual ATs in the group.

More specifically, according to the present invention, a channel condition of each receiver is first measured. The receivers are divided into receiver groups according their channel conditions. The channel is partitioned into a recurring sequence of slots, and each sequence is further partitioned into a certain number of slot groups, which are allocated to the receiver groups. More slot groups may be allocated to the receiver groups having receivers with better channel conditions. Also, receivers in a group with better channel conditions may be assigned more slots from a slot group allocated to the group.

The number of receivers admitted into a group may be restricted to a certain number. In order to keep constant the number of receivers in a group, at least one of upper and lower threshold levels of channel condition defining the group is changed as the number of receivers in the group changes.

In order to guarantee a service level to receivers in a group, as the number of receivers in the group increases or decreases, more or less slots are allocated to the group.

The channel condition may be measured at a receiver based on a pilot symbol received from the sender. Alternatively, the channel condition may be measured at the sender based on data received from the receiver.

The present invention may find its application in the adaptive data rate scheme where a data rate for a receiver is adaptively changed according to the channel condition of the receiver.

BRIEF DESCRIPTION OF SEVERAL VIEWS OF THE DRAWINGS

FIG. 10 is a table showing access terminals grouped according to another preferred embodiment;

FIG. 12 is a table showing access terminals grouped according to another preferred algorithm.

DETAILED DESCRIPTION OF THE INVENTION

The presently preferred embodiments of the invention are described herein with reference to the attached drawings, wherein like components are identified with the same references. The descriptions of the preferred embodiments contained herein are intended to be exemplary in nature and are not intended to limit the scope of the invention.

Figure 1:
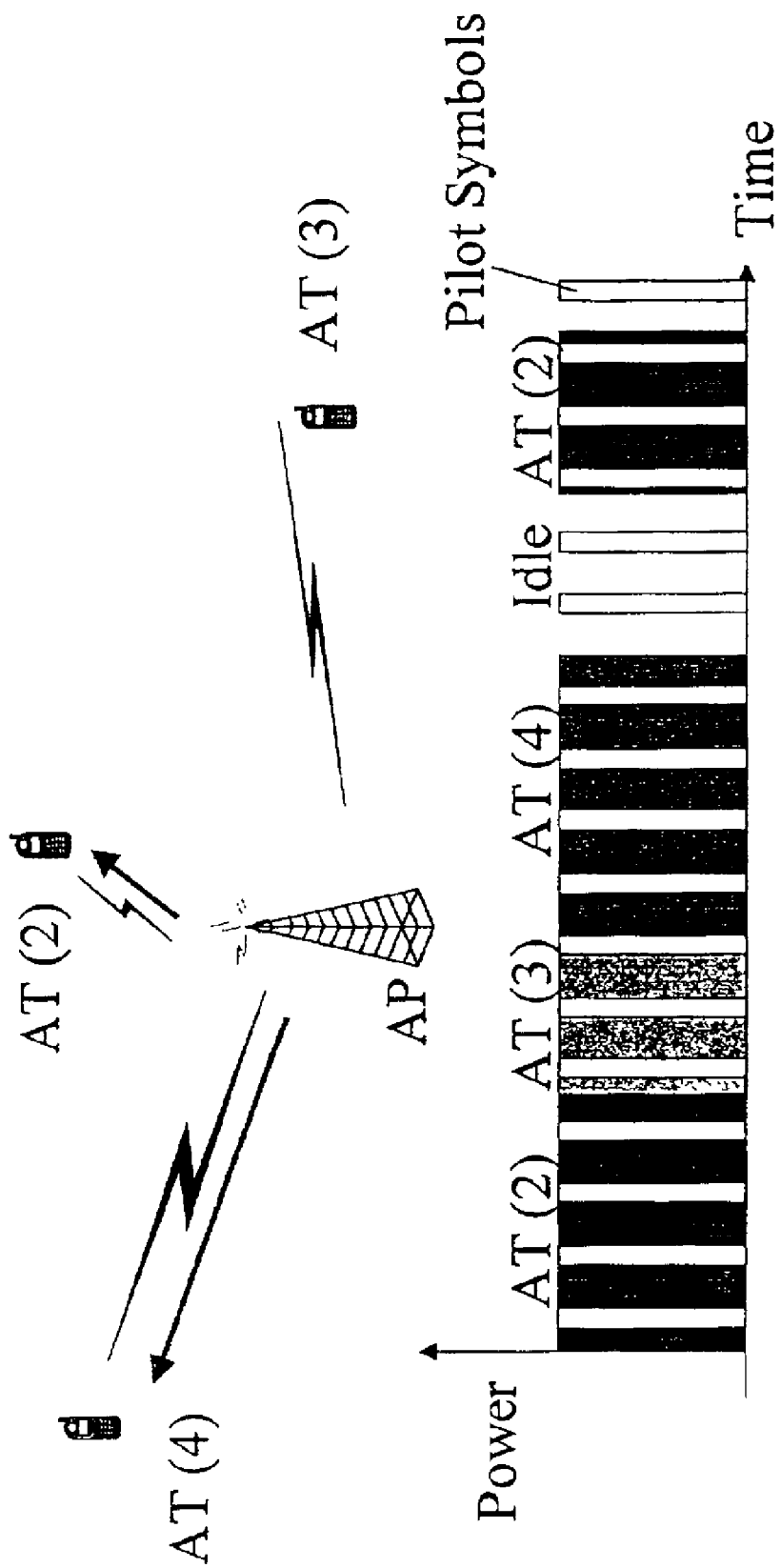
FIG. 1 is a simplified graphical representation showing assigning of slots to multiple access terminals in the adaptive data rate scheme.
Figure 2:
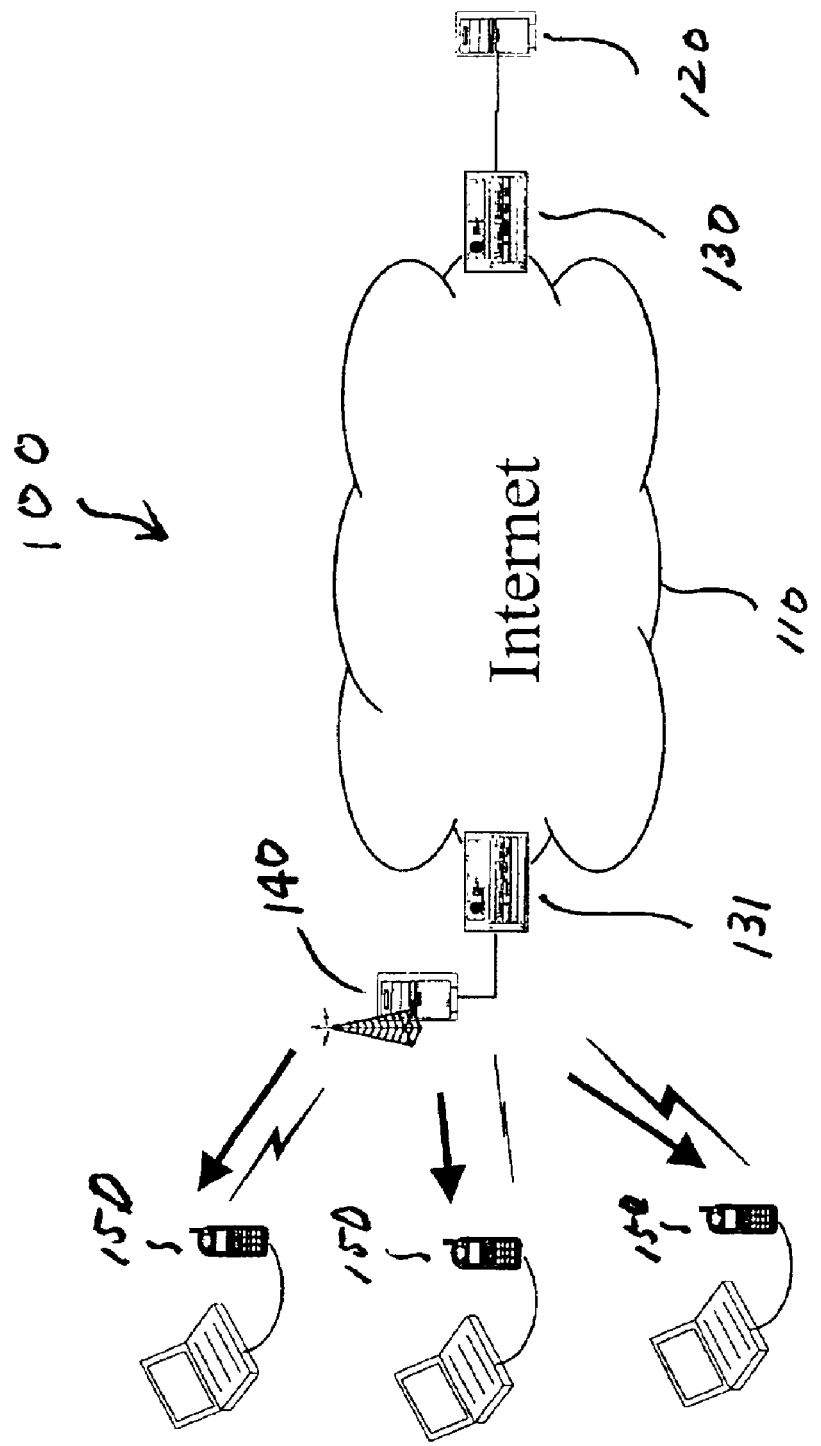
FIG. 2 is a simplified graphical representation showing a data communication network to which the present invention finds its application.

FIG. 2 illustrates graphically an exemplary third generation, wireless, mobile access, IP network 100 in which the invention is intended to find application. The network 100 includes the Internet 110. A server 120 is connected through a router 130 to the Internet. A base transceiver station (BTS) or access point (AP) 140 is also connected to the Internet through a router 131. The AP 140 is serving multiple access terminals (AT) 150. In this application, each of the ATs 150 accesses the server 120 to receive requested data therefrom through a communication path comprised of the router 130, the Internet 110, the router 131 and the AP 140. The ATs 150 and the AP 140 communicate with each other wirelessly, using TDMA, CDMA, W-CDMA or another known wireless digital data communication technology. The implementation of TDMA CDMA, W-CDMA or other wireless digital data communication technologies is standard. Detailed description thereof is not necessary to a complete understanding and appreciation of the present invention and is therefore omitted. Needless to say, other than the server 120, the routers 130 and 131, and the AP 140, there are a countless number of servers, routers and APs, which are not shown in FIG. 2, connected to the Internet 110.

The network 100 supports the Internet addressing and routing protocols. According to these Internet protocols, each of the ATs, APs, servers and routers in the network has a unique address, called the IP address. To communicate digital data over the network, a sender or source node subdivides the data to be transmitted into "IP packets." An IP packet includes communication control data, such as the IP addresses of the source node and the intended destination node, and other information specified by the protocol, and substantive data to be passed on to the destination node. A single communication of data may require multiple packets to be created and transmitted depending on the amount of data being communicated and other factors. The source node transmits each IP packet separately, and the packets are routed via intermediary routers in the network from the source node to the destination node. The packets do not necessarily travel to the destination node via the same route, nor do they necessarily arrive at the same time. This is accounted for by providing each packet with a sequence indicator as part of the packetizing process. The sequence indicators permit the destination node to reconstruct the packets in their original order even if they arrive in a different order and at different times, thus allowing the original data to be reconstructed from the packets.

For purposes of the present description, it is assumed the data network 100 adheres to the IMT-2000 standards and specifications of the ITU for wireless, mobile access networks. The proposed third generation and beyond networks support IP based data communication, i.e., all data is communicated in digital form in IP packets via Internet addressing and routing protocols from end to end. Also, in the proposed third generation and beyond wireless networks, ATs are free to move within the network while remaining connected to the network and engaging in data communications with servers through the Internet. To support mobility of the ATs 150, the data network 100 implements Mobile IP according to the Mobile standards, such as Mobile IP Version 4 (IPv4) and Mobile IP Version 6 (Pv6), proposed by the Internet Engineering Task Force (IETF).

Figure 3:
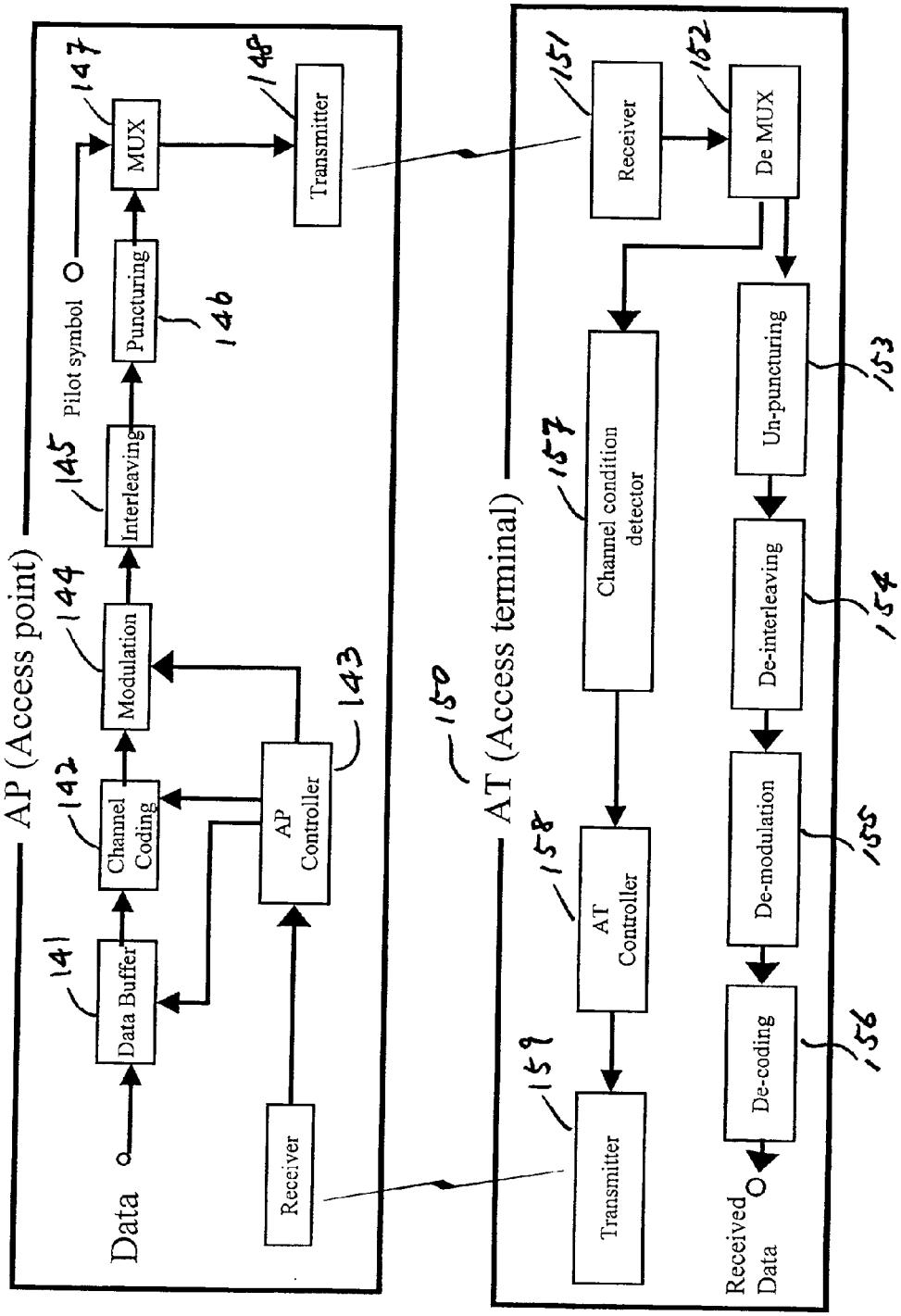
FIG. 3 is a block diagram showing the constitutions of an access point and an access terminal.

FIG. 3 is a block diagram showing the constructions of the AP 140 and the AT 150. The AP 140 receives data in packets from the Internet and stores it in a data buffer 141. The data buffer 141 may store multiple sets of data simultaneously for multiple ATs 150 that have requested the data. These sets of data are selectively supplied to an encoder 142 under instructions from an AP controller 143 which implements scheduling algorithms according to the present invention. The encoder 142 executes error coding on the data supplied from the data buffer 141. In this embodiment, the error-coding scheme used by the channel coder 141 is Turbo coding (Parallel concatenated Convolutional coding). It should however be appreciated that other Convolutional coding schemes such as Serial concatenated Convolutional coding may also be used. Convolutional codes are usually described using two parameters, a coding rate (R) and a constraint length (K). The coding rate (R) is expressed as a ratio of the length of data input into the encoder to the length of the coded data output from the encoder in a given encoding cycle. The constraint length (K) denotes the length of the Convolutional encoder, i.e., how many k-bit states are available to feed the combinatorial logic that produces the output symbol. The purpose of Convolutional coding is to improve the capacity of a channel by adding some carefully designed redundant information to the data being transmitted through the channel. Thus, the lower the coding rate (R) becomes, i.e., the more redundant information is added to the data, the more resilient the coded data becomes during its transmission against channel fading and other disturbances that cause transmission errors. In this embodiment, the encoder 142 executes Turbo coding at a coding rate of either ⅓ or ⅔. It should be noted that these coding rates are exemplary and that Turbo coding may be executed at any other rates. Also, in this embodiment, the constraint length (K) is four (4), but, needless to say, it may be any other numbers.

The coded data is then supplied to a modulator 144 for modulation. The modulator uses one of the three modulation schemes, QPSK (Quadrature Phase Shift Keying), 8PSK (Phase Shift Keying) and 16QAM (Quadrature Amplitude Modulation) to modulate the coded data from the encoder 142. Theoretically, if a signal energy to noise ratio (E/N) is sufficiently high, 8PSK has a spectral efficiency which is 1.5 times higher than that of QPSK, and 16QAM has a spectral efficiency which is two times higher than that of QPSK. But with respect to the BER (Bit Error Rate) performance, the order is reversed. 16QAM is least resilient against transmission errors and QPSK is most resilient among the three. In fact, to maintain the same BER, 16QAM needs a minimum E/N which is at least 2 dB higher than that needed by QPSK, and 8PSK needs a minimum E/N which is at least 1 dB higher than that of QPSK.

With different combinations of the coding rates and the modulation schemes, various data rates can be achieved. The following Table 1 shows these combinations and the corresponding data rates. Please note that the maximum data rates as shown in Table 1 are those that can be achieved with the use of one of the MAC (Medium Access Control) channel as a data channel.

TABLE 1

| Modulation Schemes | Coding Rates | Maximum Data Rates |
| --- | --- | --- |
| QPSK | 1/3 | 689.4 kbps |
| 8PSK | 1/3 | 1033 kbps |
| QPSK | 2/3 | 1378 kbps |
| 16QAM | 1/3 | 1378 kbps |
| 8PSK | 2/3 | 2070 kbps |
| 16QAM | 2/3 | 2761 kbps |

The modulated data then undergoes interleaving at an interleaver 145 and puncturing at a puncturer 146 and is supplied to a multiplexer (MUX) where it is time-multiplexed with pilot symbols. The data time-multiplexed with the pilot symbols is supplied to a transmitter 148 and transmitted wirelessly to ATs over downlink channels. The constructions, arrangements and functionalities of the interleaver 145, the puncturer 146, the MUX 147 and the transmitter 148 are conventional and standard. Detailed descriptions thereof are not necessary to a complete understanding and appreciation of the present invention and are therefore omitted.

Figure 4:
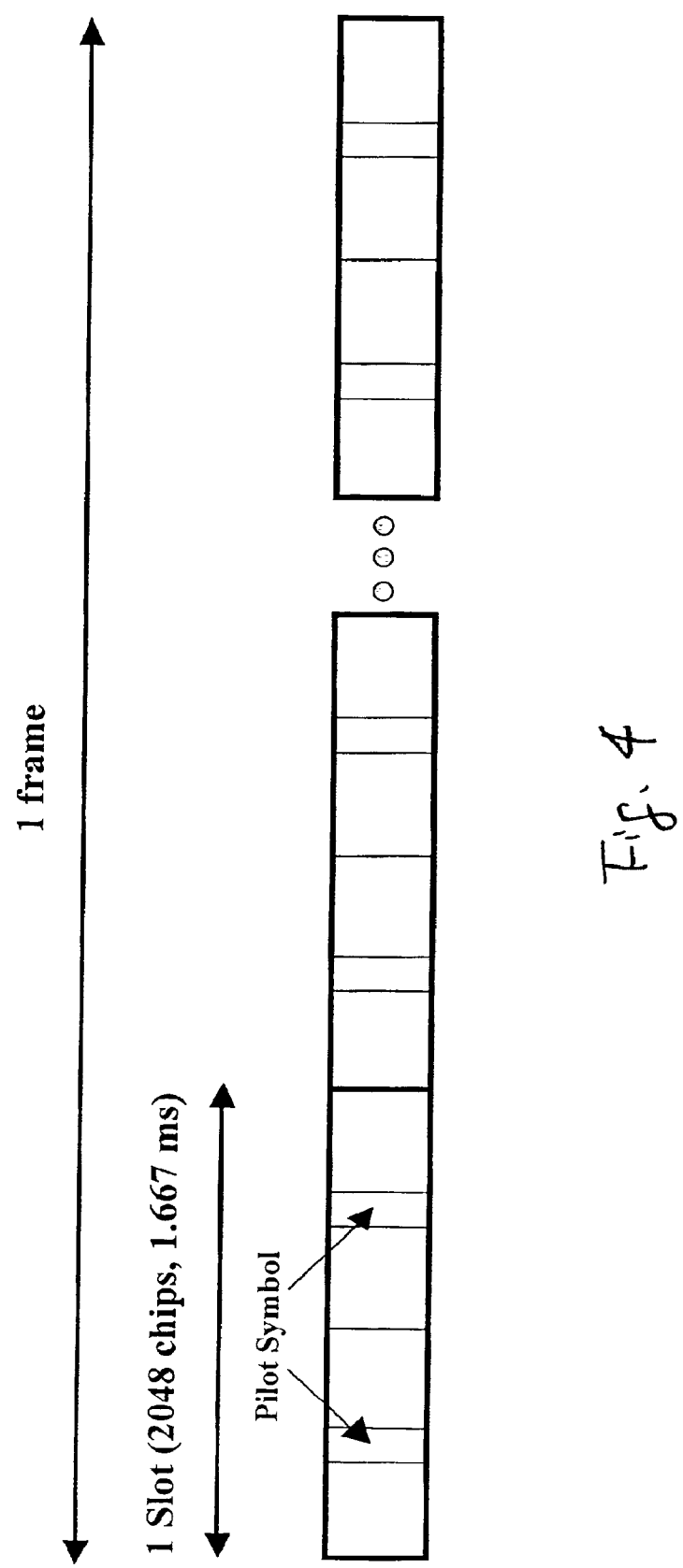
FIG. 4 is a simplified graphical representation showing a frame and slots on a TDMA channel.

The transmitter 148 uses the time division multiple access (TDMA) scheme as its main communication access scheme. In the time domain, a TDMA channel is partitioned into a sequence of frames each consisting of a plurality of time slots. One TDMA channel can be time-shared by multiple ATs which are assigned to given time slots. Under the TDMA scheme, it is possible to transmit data at a different data rate in each time slot. FIG. 4 is a graphical representation of the downlink channel used by the transmitter 148 and shows one of the TDMA frames of the channel. As shown in FIG. 4, one frame consists of a plurality of time slots each having a length of 2,048 chips or 1.667 ms and two pilot symbols inserted therein. When there is no data to be sent, the only transmissions from the AP 140 over the downlink channel are those of the pilot symbols and periodic transmissions of control information.

In an AT 150, on the other hand, the data and the pilot symbols are received by a receiver 151 and supplied to a de-multiplexer 152 where the data and the pilot symbols are separated. The data is then processed back to the original form through an un-puncturer 153, a de-interleaver 154, a demodulator 155 and a decoder 156, using the coding rate and the modulation scheme reported from the AP 140. The constructions, arrangements and functionalities of the un-puncturer 153, the de-interleaver 154, the demodulator 155 and the decoder 156 are conventional and standard. Detailed descriptions thereof are not necessary to a complete understanding and appreciation of the present invention and are therefore omitted.

The pilot symbols are supplied to a channel condition detector 157. When receiving the first of the two pilot symbols in each time slot, the channel condition detector 157 measures a channel condition, such as an SIR (signal to interference ratio), based on the received the pilot symbol and provides the channel condition information to an AT controller 158. Those skilled in the art will appreciate that the channel condition detector 157 may measure other channel condition indicators, such as signal to noise ratio (SNR), signal to noise and interference ratio (SNIR) and signal energy to noise ratio (E/N). Alternatively, an error rate, such as a frame error rate (FER) or a bet error rate (BER), may be used as channel condition information. The AT controller 158 forwards the channel condition information to a transmitter 159, which transmits the information wirelessly over an uplink channel to the AP 140 at every slot timing. In the AP 140, the channel condition information is received by a receiver 149 and supplied to the AP controller 143. The AP controller 143 maps the received channel condition information to the data rate which the downlink channel can support for the channel condition at a given level of error performance. For instance, the AP controller 143 may have a table stored therein, such as Table 2 shown below. Table 2 shows ranges of SIRS, the corresponding maximum data rates and the combinations of coding rates and modulation schemes that achieve the corresponding data rates. Table 2 is prepared through experiments conducted to determine relationships between SIRs and maximum data rates that the SIRs can support while maintaining a predetermined error level. With the channel condition information reported from the AT 150, the AP controller 143 looks up Table 2 and determines a maximum data rate for the AT, and a combination of coding rate and modulation scheme that achieves the data rate.

TABLE 2

| SIR (dB) | Maximum Data Rates | Modulation Schemes | Coding Rates | DRC |
|---|---|---|---|---|
| −7 | 689.4 kbps | QPSK | 1/3 | 1 |
| 7–11 | 1033 kbps | 8PSK | 1/3 | 2 |
| 11–14 | 1378 kbps | QPSK | 2/3 | 3 |
| 14–16 | 1378 kbps | 16QAM | 1/3 | 4 |
| 16–18 | 2070 kbps | 8PSK | 2/3 | 5 |
| 18– | 2761 kbps | 16QAM | 2/3 | 6 |

Alternatively, the AT controller 158 may have Table 2 to determine the data rate for itself. The maximum data rates may be represented by data rate control (DRC) numbers as shown in Table 2. There six DRC numbers are from 1 though 6 each corresponding to one data rate and one combination of coding rate and modulation scheme that achieves the data rate. Thus, looking up Table 2 with the channel condition information measured by the channel condition detector 157, the AT controller 158 determines the data rate and sends the corresponding DRC number to the AP. The use of the DRC numbers may increase computational overhead on ATs 150 but will significantly reduce communication overhead, compared to sending raw channel condition information, such as SIR. Please note that the block diagram as shown in FIG. 4 is drawn, focusing on downlink data transmission. The AP 140 and the AT 150 are, of course, capable of uplink data transmission. In fact, the AP 140 has a decoder, a demodulator and other functionalities, such as those shown in the AT 150, for reconstructing transmitted data. Similarly, the AT 150 has an encoder, a modulator and other functionalities, such as those shown in the AP 150 for processing data for transmission. But detailed descriptions thereof are not necessary to a complete understanding and appreciation of the present invention and are therefore omitted from FIG. 3.

Figure 5:
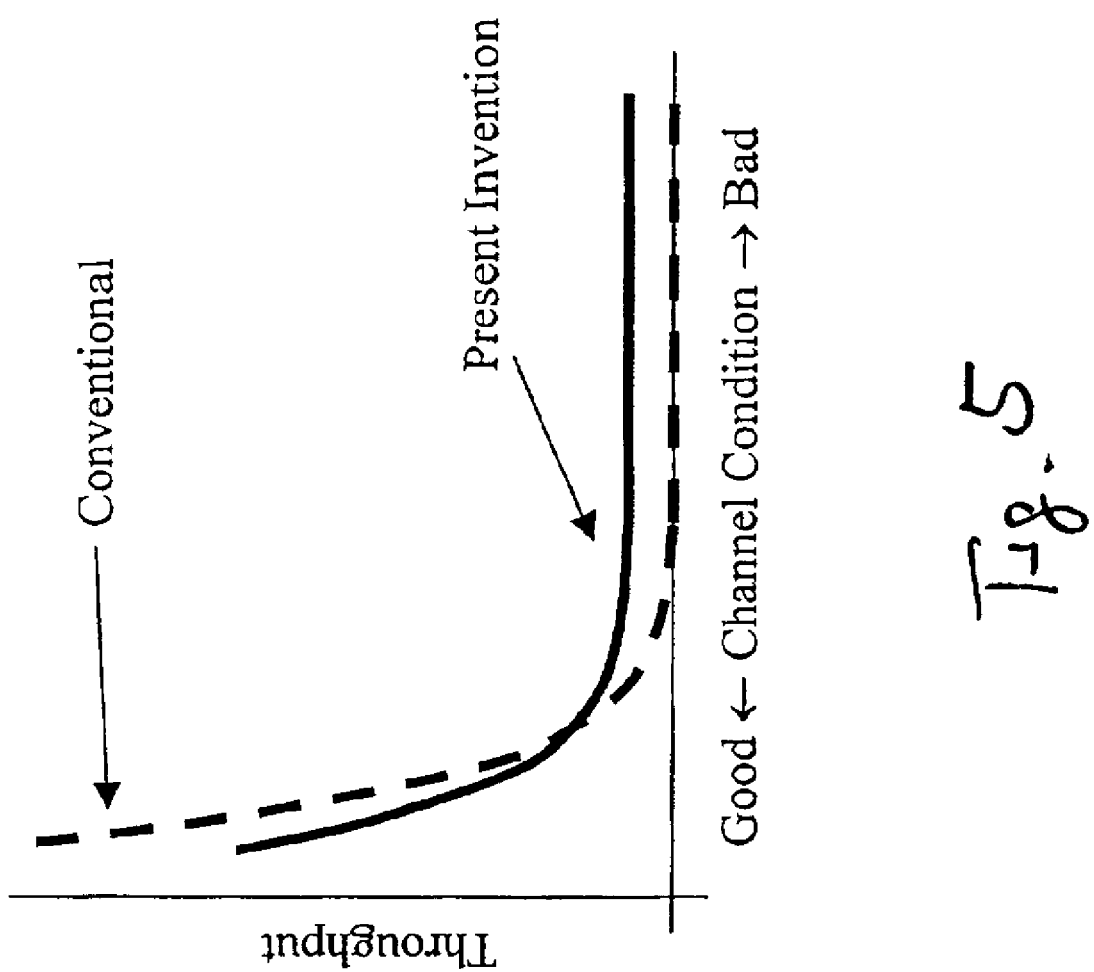
FIG. 5 is a graph showing the results of simulation in which the present invention is implemented.

A plurality of ATs 150 may request to receive data simultaneously. When the AP 140 has in the data buffer 141 multiple sets of data to be distributed to different ATs 150, scheduling of delivering data to the ATs becomes necessary. The present invention provides scheduling algorithms that guarantee minimum data transport service for even ATs with poor channel conditions. The conventional scheduling algorithms focus on maximizing average data throughput. Therefore, in a situation where a large number of ATs frequently request data, the conventional algorithms tend to serve ATs only when their channel conditions are good and leave ATs with poor channel conditions unserved until their channel conditions improve. In the present invention, data-requesting ATs are divided into a number (Ng1) of AT groups according to their channel conditions. Also, a recurring sequence of time slots is defined on the TDMA channel and partitioned into a number (Ng2) of slot groups, where Ng2 is made larger than Ng1. Generally, slot assignment according to the present invention is a two-step process. First, in each sequence, the slot groups are allocated to the AT groups so that AT groups with better channel conditions will receive more slot groups while each AT group will receive at least one slot group. Second, in each AT group, the time slots in a slot group allocated to an AT group are assigned to the individual ATs in the group. It should be noted that serving a collective of ATs as a whole and serving individual ATs are competing interests and cannot be achieved at the same time. An attempt to achieve one will necessarily compromise the other. The scheduling algorithms according to the present invention serve neither ATs as a whole nor individual ATs. The algorithms according to the present invention are designed to serve AT groups. By allocating more slot groups to AT groups with better channel conditions, the algorithms will optimize the overall data throughput. By allocating at least one slot group to each of AT groups with poor channel conditions, the algorithms guarantee the minimum service to ATs with poor channel conditions. FIG. 5 shows simulation results obtained when implementation of the present invention is simulated. In FIG. 5, the channel condition goes poorer from left to right on the horizontal axis. As shown in FIG. 5, under the conventional algorithm, data throughput becomes almost zero when the channel condition is poor. Under the algorithm according to the present invention, although data throughput is slightly lower when the channel condition is good, it never goes down to zero even when the channel condition deteriorates.

Figure 6:
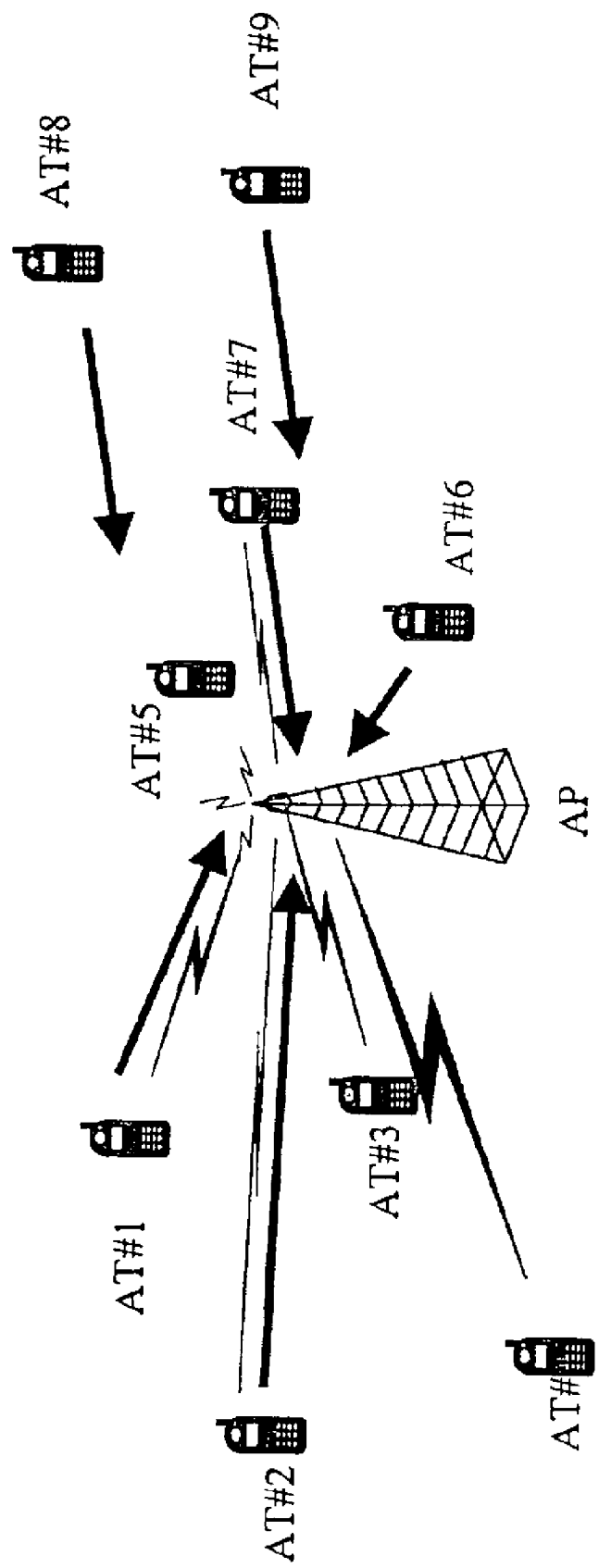
FIG. 6 is a graphical representation showing a geographical relationship between an access point and access terminals that request data from the access point.
Figure 7A:
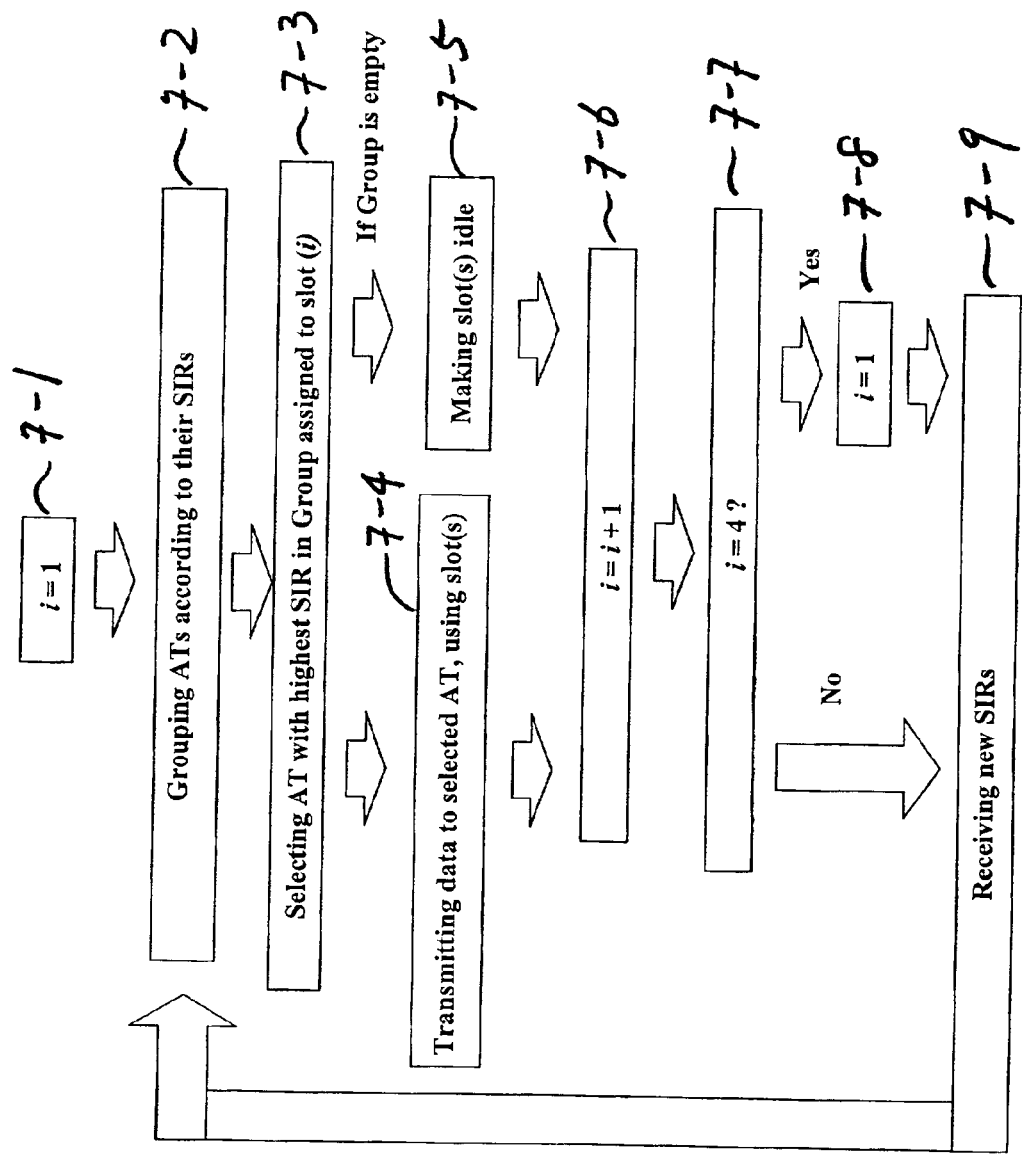
FIG. 7A is a flowchart showing processes of a preferred scheduling algorithm according to the present invention.
Figures 7B, 7C:
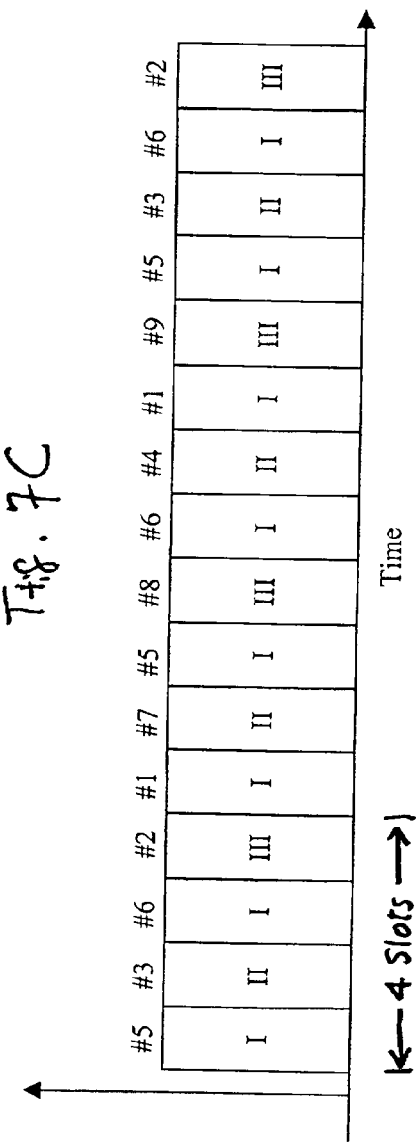
FIG. 7B is a table showing access terminals grouped according to the preferred algorithm of FIG. 7A.
FIG. 7C is a graphical representation of a TMDA channel showing scheduling of service to access terminals that is made according to the preferred algorithm of FIG. 7A.

Now, preferred scheduling algorithms according to the present invention will be explained in detail. The AP controller 143 (FIG. 3) has a scheduler therein that implements the algorithms according to the present invention. Suppose that as shown in FIG. 6, nine ATs 150 (1–9) have requested data from the Internet, and the AP 140 has nine sets of data ready to be distributed to respective ATs 1–9. As explained above, AP 140 periodically sends out a pilot symbol. Upon reception of a pilot symbol, each AT sends back channel condition information to the AP. In this embodiment, the channel condition information comprised of an SIR measured at each AT. FIG. 7A is a flowchart showing a preferred scheduling algorithm. The scheduling algorithm begins with Step 7-1 where slot number (i) is made equal to 1. Then, the scheduler in the AP controller 143 groups ATs 1–9 according to their respective SIRs (Step 7-2). FIG. 7B shows respective SIRs of ATs 1–9. In grouping ATs 1–9, their SIRs are compared against two threshold values, 14 dB and 7 dB. ATs with SIRs lower than 7 dB are grouped in group III. ATs with SIRs between 7 and 14 dB are grouped in group II. ATs with SIRs higher than 14 db are grouped in group I. As a result, ATs 1–9 are grouped as shown in FIG. 7B from the AT with the highest SIR (AT 5) to the AT with the lowest SIR (AT 9). In this embodiment, ATs 1–9 are divided into three groups for simplicity. It should be noted that the number of groups is not limited to three. ATs 1–9 may be divided into any other numbers of groups.

The TDMA channel from the AP 140 is partitioned into a recurring sequence of consecutive time slots. Each sequence is further partitioned into slot groups, where the number of the slot groups in each sequence is made larger than the number of the AT groups, which is three in this embodiment. Also, at least one slot group is allocated to each AT group. Further, AT groups with good channel conditions receive more slot groups. In this embodiment, for simplicity, each slot sequence consists of four consecutive time slots. Thus, the number of the slot groups in one sequence is four, and each slot group consists of one slot. Also, in each slot sequence, two slots are assigned to group I, and one slot is assigned to each of groups II and III. Further more, the slots in one sequence are numbered from 1 though 4. Each AT group receives slots with the same numbers in each sequence. In this embodiment, it is predetermined that group I receives slot Nos. 1 and 3, group II receives slot No. 2, and group III receives slot No. 4. The slot allocation is shown in FIG. 7C. As shown in FIG. 7C, a slot allocated to group I shows up every other slot. A slot assigned to each of groups II and III shows up every four slots.

Returning to FIG. 7A, in step 7-3, the scheduler selects one AT with the highest SIR in the group that has received slot (i) in a sequence. Again, slot (1) and slot (3) are assigned to group I. Slot (2) is assigned to group II. Slot (4) is assigned to group III. For instance, if i=1, AT 5 or AT 6 is to be selected because they have the highest SIR, i.e., 20 dB, in group I. A selection between AT 5 and AT 6 may be made based on the lengths of data to be delivered to these ATs. The lengths of data can be obtained from the server 120 (FIG. 2). It may be practical to choose one of them requesting longer data over the other. In response to the selection made by the scheduler, the AP controller 143 first looks up its Table 2 and finds the coding rate and the modulation scheme that correspond to AT 5's SIR, i.e., 20 dB. The AP controller 143 accesses the data buffer 141 and takes out data to be sent to AT 5 and supplies the data to the encoder 142. Data taken out from the data buffer 141 has the length that can be sent in one time slot. The encoder 142 encodes the data at the coding rate found in Table 2 and provides the coded data to the modulator 144, where the coded data is modulated, using the modulation scheme also found in Table 2. The modulated data is then interleaved and punctured by the interleaver 145 and the puncturer 146, and transmitted from the transmitter 148 to the AT 5, using slot (1) (Step 7-4). If the group that has received slot (i) is empty, slot (i) is made idle (Step 7-5), and no data is sent in slot (i). Next, the value of "i" is incremented (Step 7-6). If "i" indicates the last slot in a sequence, which is four in this embodiment (Step 7-7), "i" is returned to 1 (Step 7-8), and the scheduler moves to Step 7-9. Otherwise, the scheduler moves from Step 7-7 directly to Step 7-9. In Step 7-9, the scheduler receives a new set of SIRs from AT 1–9. With this new set of SIRS, the scheduler regroups the ATs (Step 7-2). Since the scheduler receives a new set of SIRs every slot timing, the regrouping is also conducted every slot timing. Thereafter, Steps 7-3 to 7-8 are repeated on the regrouped groups I, II and III. As result, ATs 1–9 are served in the order as shown in FIG. 7C.

A selection of an AT in a group may be made at every slot timing or when service to the one previously selected is completed. For instance, in FIG. 7C, ATs 5, 6 and 1 in group I are served sequentially one slot at a time. Instead of sequentially serving these ATs one slot at a time, service may provided to the ATs in such a manner that service is provided to one AT in the group, using all the slots allocated to the group, until all the requested data is sent to the one AT and that service is then provided to a next AT after service to the AT previously selected is completed. In such an arrangement, service should continue to be provided to one AT until it is completed even if the channel condition of the AT deteriorates during the course of transmitting data to the AT.

Figure 8A:
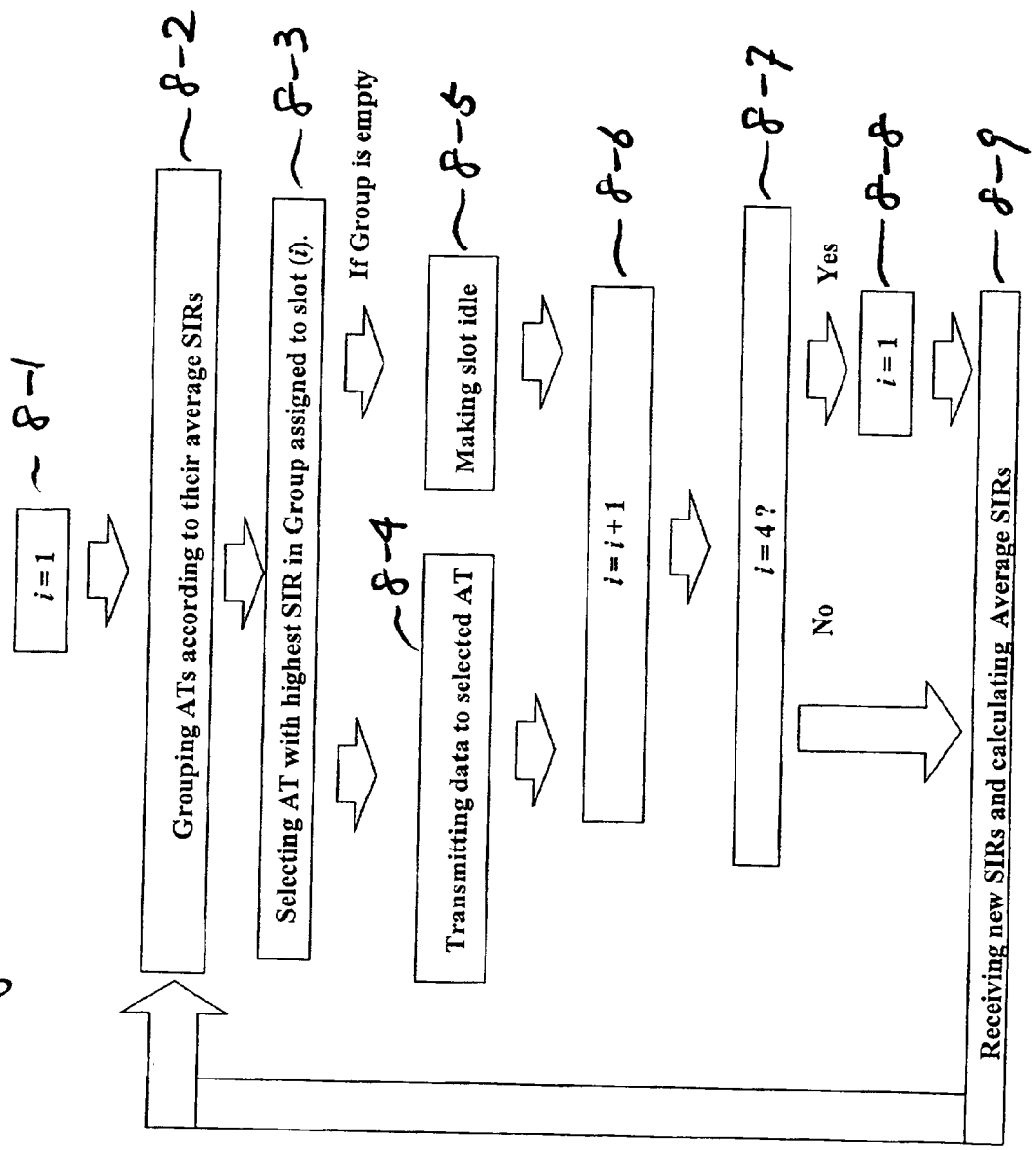
FIG. 8A is a flowchart showing processes of another preferred scheduling algorithm according to the present invention.
Figures 8B, 8C:
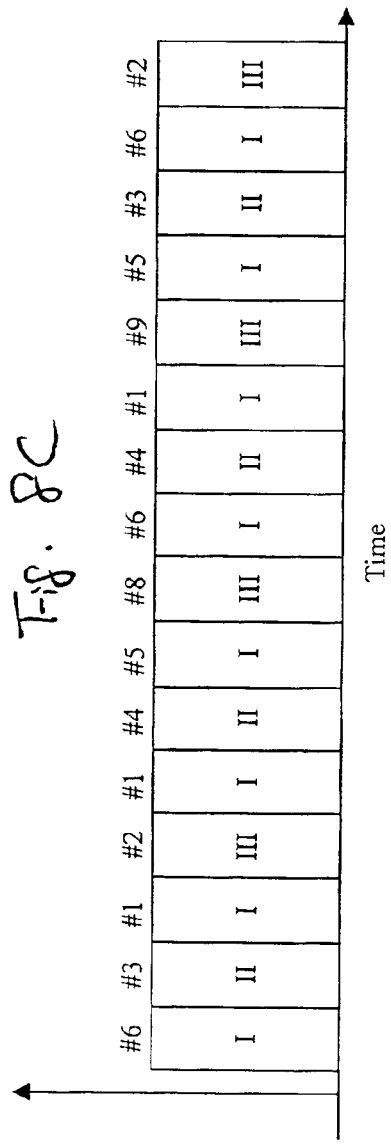
FIG. 8B is a table showing access terminals grouped according to the preferred algorithm of FIG. 8A.
FIG. 8C is a graphical representation of a TDMA channel showing scheduling of service to access terminals that is made according to the preferred algorithm of FIG. 8A.

FIGS. 8A, 8B and 8C show the second preferred embodiment of the present invention. In the second embodiment, AT 1–9 are grouped based on weighted averages of their SIRs while an AT with the highest current SIR is served first in a group. An average SIR ($\overline{SIR}$) is calculated, using the following equation (1):

$$\overline{SIR}_{(i)} = (1-\alpha) \times SIR_{(i)} + \alpha \times \overline{SIR}_{(i-1)} \quad (1)$$

where $0 \leq \alpha \leq 1$, and if $\alpha=0$, $\overline{SIR}_{(i)} = SIR_{(i)}$ FIG. 8A is a flowchart showing the second embodiment of the scheduling algorithm according to the present invention. As in the first embodiment discussed above with FIGS. 7A–7C, the scheduler schedules delivery of data to nine ATs 1–9. In FIG. 8A, the processes equivalent to those already discussed with FIG. 7A will not be explained here to avoid redundancy, and only the processes peculiar to the second embodiment will be explained. In Step 8-9, every slot timing, the scheduler receives new SIRs from the ATs 1–9 and calculates their averages, using the above equation (1). For each of ATs 1–9, equation (1) calculates a weighted average of a current SIR and an average SIR calculated one slot before. In FIG. 8B, the column labeled "$\overline{SIR}_{(t-1)}$" shows average SIRs calculated one slot before. The column labeled "$SIR_{(t)}$" shows the SIRs just received from ATs 1–9. In this second embodiment, the weight "$\alpha$" in equation (1) is selected to be 0.9. Of course, the weight "$\alpha$" may be any other numbers.

Turning back to FIG. 8A, based on the calculated average SIRs, the scheduler divides ATs 1–9 in three groups I, II and III (Step 8-3), using the threshold levels of 7 dB and 14 dB. FIG. 8B shows the result of the grouping. In selecting an AT in a group (Step 8-3), the scheduler selects one with the highest current SIR($_t$) first. For instance, AT 6 or AT 1 is to be selected first in Group I; AT 3 or AT 4 is to be selected first in Group II; and the AT 2 is to be selected first in Group III. As a result, ATs 1–9 are served in the order as shown in FIG. 8C.

Figure 8D:
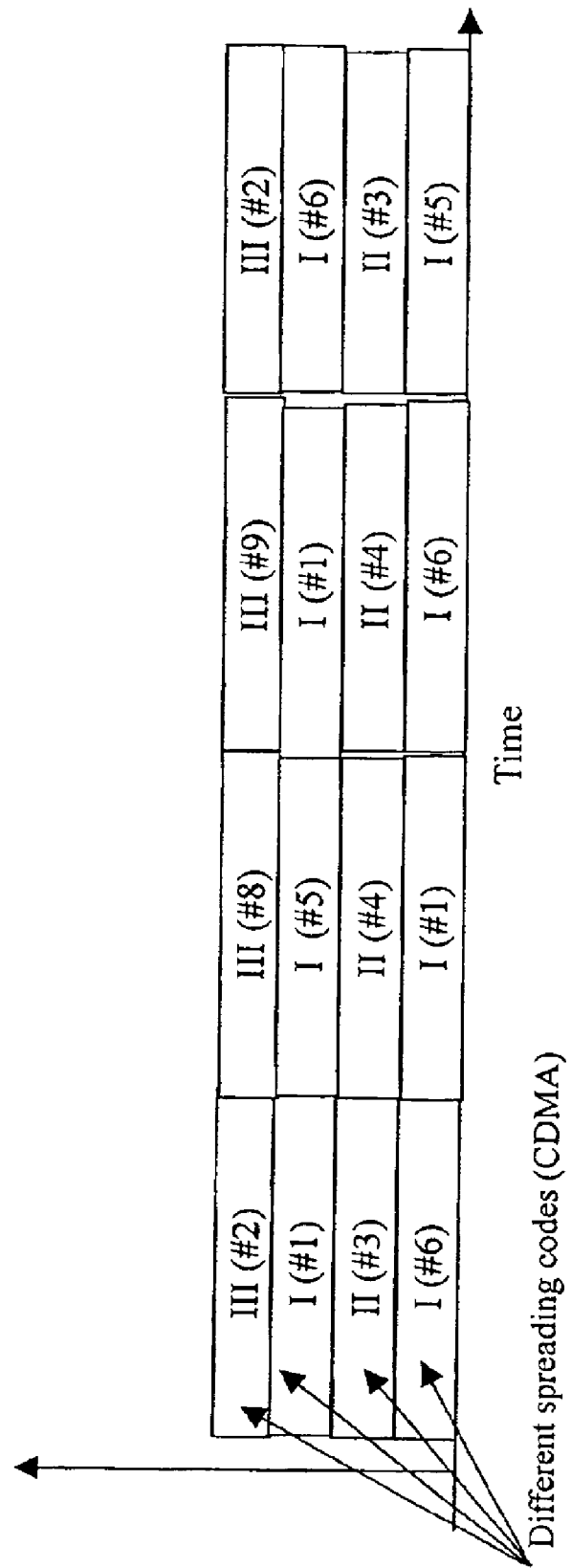
FIG. 8D is a graphical representation of a TDMA channel implemented on CDMA channels.

The scheduling algorithm as discussed with FIGS. 8A, 8B and 8C may be implemented on code division multiple access (CDMA) channels. CDMA spreads multiple data streams with different spread codes and thus can create multiple channels simultaneously over the same RF bandwidth. As shown in FIG. 8D, four CDMA channels are created among which two channels are allocated to group I, and one channel is allocated to each of group II and group III. Each CDMA channel is partitioned in slots, like a TDMA channel, so that a plurality of ATs can time-share a CDMA channel. ATs 1–9 grouped as shown in FIG. 8B are scheduled on the CDMA channels in the same manner as discussed with the flowchart of FIG. 8A.

Figures 9A, 9B:
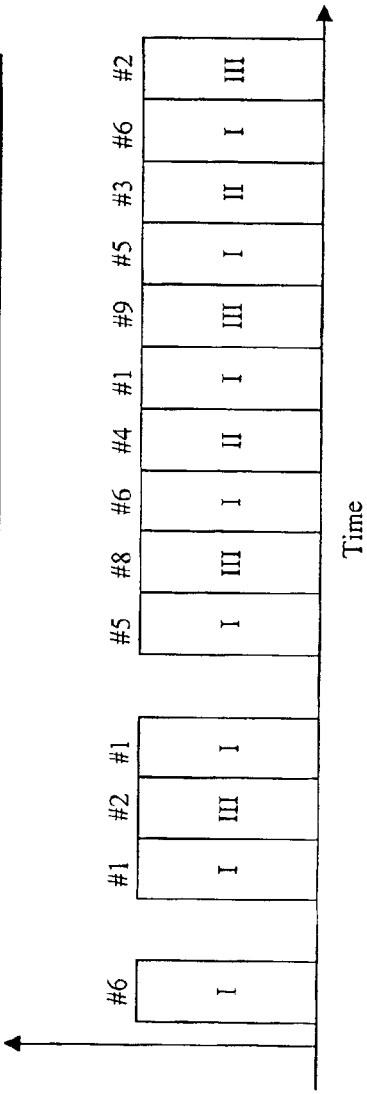
FIG. 9A is a table showing access terminals grouped according to another preferred embodiment.
FIG. 9B is a graphical representation of a TDMA channel showing scheduling of service to access terminals on the table of FIG. 9A.

If a particular AT currently has an extremely low SIR, it may be preferable not to send data to the particular AT but optionally send data to another AT, using the slots assigned to the particular AT. In FIG. 9A, AT 1–9 are divided into groups I, II and III, according to their average SIRS. Now, looking at ATs 3, 7 and 4, their current SIRs are extremely low. Nonetheless, they are joined in group II because their previous average SIRS are high. A threshold value (C_TH) is predefined that indicates the minimum SIR needed for data to get through to a destination AT. In other word, if the current SIR of an AT is lower than the C_TH, no data is expected to reach the AT. Suppose that the C_TH is 3 dB, none of ATs 3, 7 and 4 qualifies to receive data. It is a waste of resources to try to send data to any of these ATs. The algorithm according to the present invention will transmit no data to any of these ATs until their current SIRs recover to go above the C_TH. The C_TH is used in the processes in Step 8-3 of FIG. 8. As discussed above, the second slot in each slot sequence is allocated to group II. When i=2, the scheduler selects the AT with the highest SIR from group II (Step 8-3). The AT with the highest SIR in group II is AT 7 or 4. The scheduler then compares the SIR of the AT against the C_TH, which is 3 dB. But neither AT 7 nor AT 4 has an SIR higher than the C_TH. If the SIR of the selected AT does not exceed the C_TH, the scheduler moves to Step 8-5 and sends no data. As a result, as shown in FIG. 9B, the second slots in the first and second sequences are made idle, and no data is transmitted in these two slots. The SIRs of ATs 3, 7 and 4 may be temporarily low. When the SIRs of any of these ATs become higher than the C_TH, the scheduler will resumes transmission of data to the ATs as shown in FIG. 9B (See the second slot in the third sequence, where transmission of data to group II is resumed). It should be noted that instead of making such slots idle, the scheduler may send data to ATs in other groups, using the slots.

As discussed above, the algorithm according to the present invention is designed to serve AT groups and does not serve individual ATs directly. By allocating more slot groups to AT groups with better channel conditions (, or more specifically, AT groups with ATs having better channel conditions), the algorithm will optimize the overall data throughput. By allocating at least one slot group to AT groups with poor channel conditions, the algorithm guarantees the minimum service to ATs with poor channel conditions. However, this design concept of the algorithms may not work well if the number of the ATs in a group increases disproportionally to those in the other groups. Taking FIG. 8B as an example, to maximize the overall data throughput, the ATs in group I should receive more time slots than those in group II or group III. Likewise, the individual ATs in group II should receive more time slots than those in group III. Suppose that the number of ATs in group I increases. Given that the number of slots allocated to group I does not change, an increase of ATs causes deterioration of service to the individual ATs in group I. In other words, when the number of ATs in group I increases, the individual ATs in the group will receive less slots. It may result that if the number of ATs in group I increases significantly disproportionally to that of group II, the individual ATs in the group I receive less slots than those in group II although more slots are allocated to group I than group II. If this happens, the overall data throughput is expected to deteriorate.

One way to prevent such a situation from happening is to set a maximum AT number for each group and restrict the number of ATs in the group equal to or less than the maximum number. For instance, as shown in FIG. 10, ATs 1–9 are divided into three groups I, II and III according to their average SIRs. In FIG. 10, the maximum number of ATs allowed to be joined is predetermined and fixed to three for each of the groups. Also, in grouping the ATs, the scheduler groups ATs with higher average SIRs ($\overline{SIR}_{(t)}$) first. Now, looking at AT 2 in FIG. 10, its average SIR is 8 dB and should be placed into group II. But since ATs with higher average SIRs are grouped first, group II is already filled with ATs 3, 7 and 4. Accordingly, AT 2, whose average SIR exceeds the threshold value of 7 dB, is grouped into group III. This is unfair to AT 2 but necessary to increase the overall data throughput.

Figure 11A:
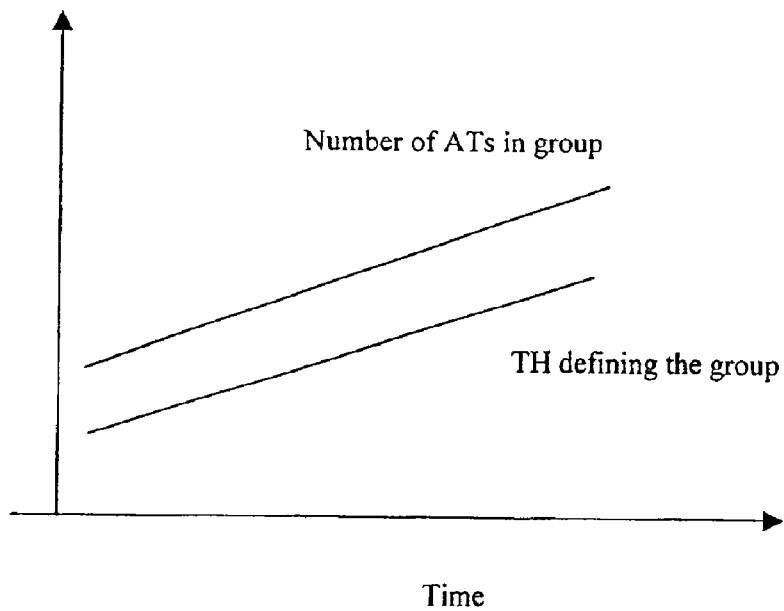
FIG. 11A is a graph showing relationship between the number of access terminals in a group and a threshold level defining the group in an arrangement to keep the number of access terminal constant in the group.

The number of the ATs in a group can be restricted indirectly by changing the threshold values used for grouping ATs. Suppose that the maximum number of the ATs allowed to be joined in each group is predetermined, but the scheduler groups ATs 1–9 without regard to the predetermined number. After grouping the ATs, the scheduler checks the number of the ATs in each group and determines if the number of the ATs in each group is larger than the predetermined number, allowing a certain percentage of margin, for instance 20% of the predetermined number. If the scheduler finds a group that has more ATs, allowing a certain percentage of margin, than allowed to be in the group, the scheduler changes the threshold values that define the group so as to reduce the number of ATs to be admitted into the group in the next grouping process. A margin is necessary because most small frustrations of the number of the ATs over the predetermined number are considered temporary. Thus, the scheduler acts to change threshold values only when the number of the ATs jumps up over the predetermined number by more than, for instance, 20% thereof. The scheduler will disregards increases of the ATs within the margin even if the number of the ATs exceeds the predetermined number. In situations where the number of the ATs increases over the maximum number by more than 20% thereof, it will probably be the most practical solution to raise the threshold level defining the bottom line of the group. By raising the bottom threshold level, the number of ATs to be admitted into the group is expected to decrease. An amount of threshold value increased at a time is set to be, for instance, 1 dB. Thus, as shown in FIG. 11A, the bottom threshold level is increased as the number of ATs increases. The same arrangements may be made for decrease in the number of ATs. That is, if the number of the ATs decreases below the predetermined number by more than, for instance, 20% thereof, the bottom threshold level is lowered by, for instance, 1 dB. By lowering the bottom threshold level, the number of ATs to be admitted into the group is expected to increase.

Figure 11B:
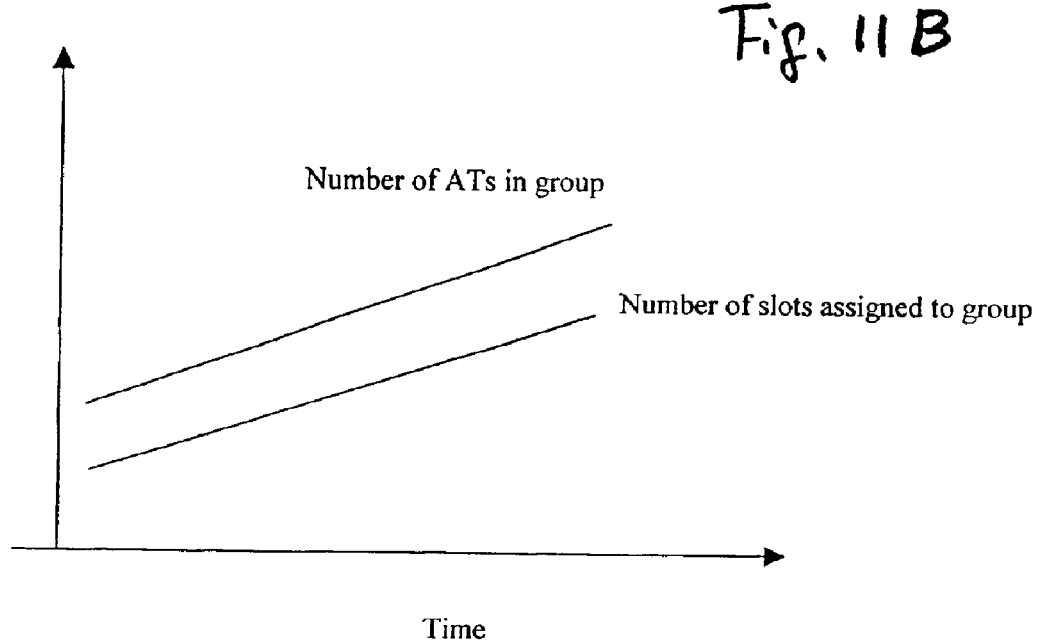
FIG. 11B is a graph showing relationship between the number of access terminals in a group and the number of slots allocated to the group in an arrangement to maintain a service level to individual access terminals in the group constant when the number of the access terminals in the group changes.

The whole purpose of restricting the numbers of ATs admitted in groups is to maintain the quality of service to individual ATs at predetermined levels. This is necessary to maximize the overall data throughput. The same purpose may be achieved by changing the number of slots allocated to a group as the number of the ATs in the group changes. That is, as shown in FIG. 11B, when the number of ATs in a group increases, the quality of service to the individual ATs may be maintained by increasing the number of slots allocated to the group. Similarly, when the number of ATs in a group decreases, the quality of service to the individual ATs may be maintained at a predetermined level by decreasing the number of slots allocated to the group.

Figure 11C:
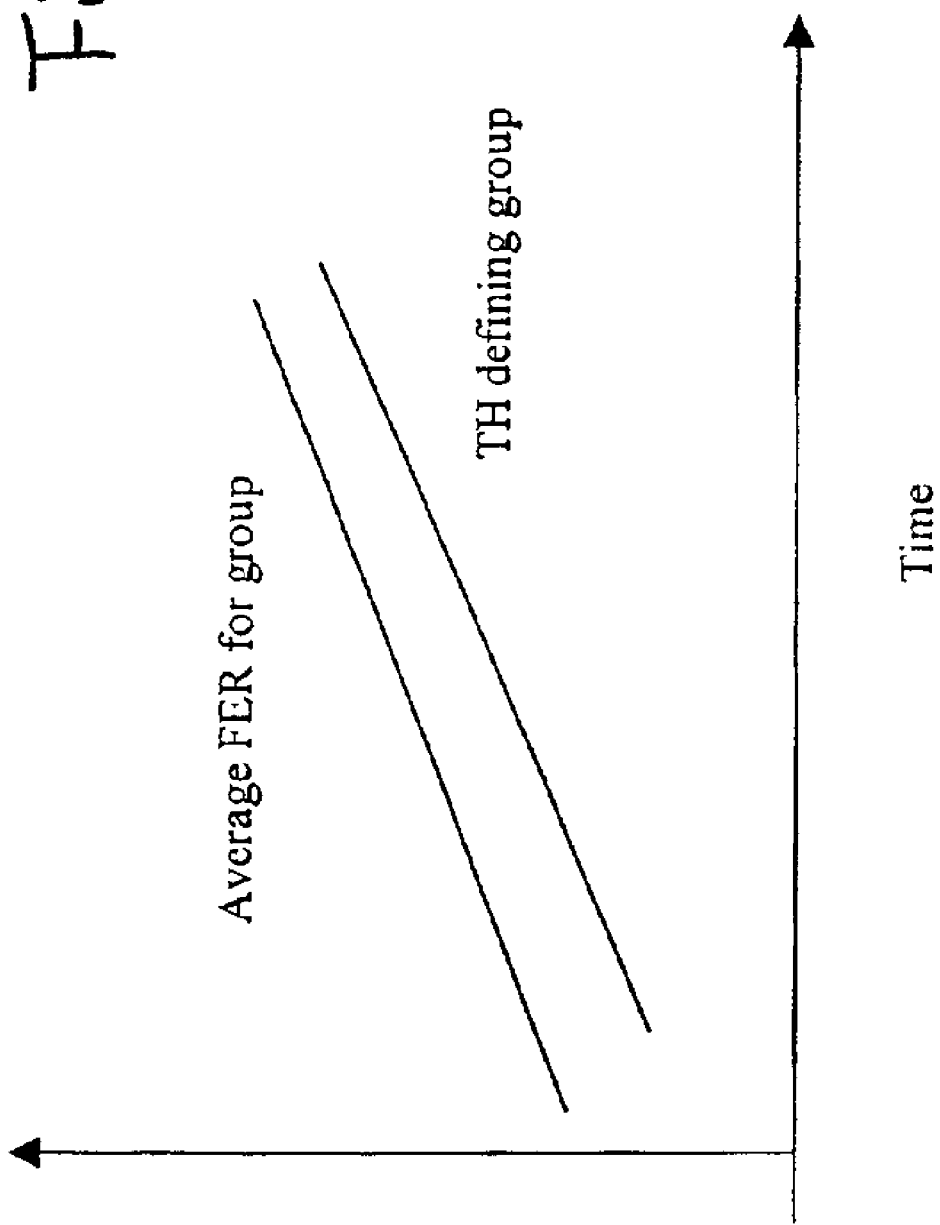
FIG. 11C is a graph showing relationship between the average FER of the access terminals in a group and a threshold level defining the group in an arrangement to keep the average FER in the group constant.

The concept of changing a threshold level may be used to maintain the average channel condition in a group. The average channel condition in a group that may be represented by the average of the FERs (frame error rate) of the ATs in the group may need to be maintained at a constant level. If the average FER increases, it needs to be lowered. It is probable that ATs located near the lower end of a group cause an increase in average FER of the group. Therefore, as the average FER in a group increase, the lower threshold level defining the bottom of the group is raised as shown in FIG. 11C. By the raising the lower threshold level, ATs with low FER will be placed the group below.

In the above embodiments, signal to interference ratio (SIR) is used as channel condition information based on which ATs 150 are grouped and selected in the AP 140. But other channel condition information may be used for the same purpose, such as signal to noise and interference ratio (SNIR) and signal energy to noise ratio (E/N). Error rates may be used for the same purpose, such as frame error rate (FER) and bit error rate (BER). Also, in the above embodiments, ATs 150 measure their SIRs and send them to the AP 140, which converts the measured SIRs into corresponding data rates, using above Table 2. The conversion of SIRs into data rates may be performed in individual ATs 150, which send the raw data rates or DRCs to the AP 140. These data rates or DRCs may be used in the AP 140 for grouping and selecting the ATs 150. An embodiment using DRCs is shown in FIG. 12. In FIG. 12, the scheduler calculates an average DRC ($\overline{DRC}_{(t)}$) for each of the ATs, using equation (2) noted below.

$$\overline{DRC}_{(t)}=(1-\alpha)\times DRC_{(t)}+\alpha\times\overline{DRC}_{(t-1)} \quad (2)$$

where $0\leq\alpha\leq 1$, and if $\alpha=0$, $\overline{DRC}_{(t)}=DRC_{(t)}$

The scheduler then groups the ATs based on their average DRCs. In grouping the ATs, an AT with an average DRC of 4, 5 or 6 is placed in group I. An AT with an average DRC of 2 or 3 is placed in group II. An AT with an average DRC of 1 or lower is placed in group III. In selecting an AT in a group, however, the scheduler calculates a ratio of the current DRC and the average DRC, i.e., $$\left(\frac{DRC_{(i)}}{\overline{DRC}_{(i)}}\right),$$

for each of the ATs in the group and selects the AT with the highest ratio. Also, in grouping the ATs, the scheduler may use the DRCs directly, instead of using the average DRCs.

ATs may contract to receive different qualities of service which may be indicated by quality of service (QoS) factors. The QoS factors indicate the levels of services to be guaranteed for the ATs. A higher QoS factor indicates that higher quality of service must be provided and guaranteed. Among ATs 1–9, some or all of them may contact to have guaranteed QoS. If all of AT 1–9 have contracted to have guaranteed QoS, the above ratio $$\left(\frac{DRC_{(i)}}{\overline{DRC}_{(i)}}\right)$$

may be multiplied by a (QoS) factor. In selecting an AT from a group to which the AT belongs, the scheduler calculates a ratio weighted by a QoS factor for each of the ATs in the group. A ratio weighted by a QoS factor is expressed by $$\left(\frac{DRC_{(i)}}{\overline{DRC}_{(i)}}\times QoS\right).$$

The scheduler then selects from the group one AT which has the highest weighted ratio. Alternatively, the ATs in each group are further divided into two subgroups. One subgroup consists of ATs with high QoS factors. The other subgroup consists of ATs with low QoS factors. In selecting an AT from a group, the scheduler selects the AT from a subgroup with high QoS factors first. If QoS factors are used, ATs may not have to be grouped. For each of ATs 1–9 being not grouped, the scheduler calculates the weighted ratio. In assigning slots to ATs 1–9, the scheduler selects the AT with the highest weighted ratio. If among ATs 1–9, some contact to have guaranteed QoS, but the others do not, the scheduler may divide ATs 1–9 into a group with no guaranteed QoS and a group with guaranteed QoS. In each slot sequence, the scheduler assigns more slots to the group with guaranteed QoS so that the ATs with guaranteed QoS will be served favorably over the ATs with no guaranteed QoS. The group with guaranteed QoS may also be divided into a subgroup with high QoS and a subgroup with low QoS. In such an arrangement, the scheduler serves the subgroup with high QoS first and the subgroup with low QoS later. The ATs with no guaranteed QoS are served in the manner, for instance, as shown in above FIG. 7A or 8A.

In the above embodiments, the scheduler performs the grouping and selection of ATs based on current values and/or past average values of channel condition information (SIRs) or data rates (DRCs). The scheduler may calculate future values and perform the grouping and selection of ATs based on the calculated future values. There are many statistical methods available to predict future values. One of the simplest ways to predict a future value is a linear prediction method which uses the following equation (3):

A future value $(t+1)=2\times$(current value $(t)$)$-$(previous value$(t-1)$)(2)

Suppose that SIR(t) is 10 dB, and SIR(t−1) is 9 dB. Using the above equation (2), SIR(t+1) is 11 dB.

In the above embodiments, the channel condition is measured at an AT 150, using a pilot symbol received from the AP 140. If the time division duplexing (TDD) scheme is adopted, however, the AP 140 may measure the channel condition. Under the TDD scheme, sender and receiver, i.e., the AP 140 and the ATs 150, time-share the same channel. Under this scheme, the AP 150 can estimate the downlink conditions by measuring the uplink conditions, using data from the ATs 150.

The algorithms according to the present invention are designed to maximize the overall data throughput while guaranteeing minimum service to ATs with poor channel condition. Even using these algorithms, if a large number of ATs request data simultaneously, the minimum service may not be able to be guaranteed to ATs with poor channel condition. Therefore, to guarantee the minimum service to ATs with poor channel condition, an arrangement may be necessary that restricts the number of ATs allowed to receive service simultaneously. In such an arrangement, once the number of ATs requesting data reaches a certain threshold level, further requests from other ATs will be rejected. Alternatively, another arrangement is possible that once the number of ATs requesting data reaches the threshold level, further requests from other ATs will be put on hold, and those ATs whose request are on hold are placed on a waiting list. Each time service is completed to one AT, and the one AT is removed from an active list, one AT on the waiting list is moved to the active list to receive service. Moreover, if an AT is on the waiting list for a certain time, the AT will be moved to the active list, even when no AT is removed from the active list. Low service may be better than nothing.

The concept of the present invention may be applied to a situation where the AP 140 multicasts data to a plurality of ATs 150. When multicasting data to a plurality of ATs 150, an arrangement may be made in which the scheduler multicasts data at a predetermined multicast data rate when all or most of the ATs are requesting data rates that are more than the predetermined data rate. After multicasting data at the predetermined multicast data rate to ATs, if any of the ATs fail to receive the data and return a NACK, the scheduler lowers the multicast data rate and multicasts data at the lowered data rate to the ATs that have returned the NACK. The scheduler holds multicasting of data until all or most of the ATs request more than the predetermined multicast data rate. However, the scheduler cannot hold the multicasting for long. Accordingly, if it holds multicasting of data for a certain time period, the scheduler begins the multicasting at the lowest data rate requested among the ATs 150.

Once the scheduling is done, the scheduler may send the ATs 150 the scheduling result such as shown in FIG. 7C. By receiving the scheduling result, the ATs will know what slots are assigned to them. The ATs 150 may put themselves in a sleep mode during the slots not assigned to them but wake up to get themselves ready to receive data at the slots assigned to them.

What have been described are preferred embodiments of the present invention. The foregoing description is intended to be exemplary and not limiting in nature. Persons skilled in the art will appreciate that various modifications and additions may be made while retaining the novel and advantageous characteristics of the invention and without departing from its spirit. Accordingly, the scope of the invention is defined solely by the appended claims as properly interpreted.

What is claimed is:

1. A method for dynamically scheduling communications to a plurality of receivers over a TDMA channel that is partitioned into frames each consisting of slots, comprising the steps of:

measuring a channel condition of each receiver;

dividing the receivers into receiver groups according their channel conditions;

partitioning the TDMA channel into a recurring sequence of slots;

dividing each sequence into a certain number of slot groups; and allocating the slot groups to the receiver groups according to the receivers' channel conditions.

2. A method according to claim 1, wherein more slot groups are allocated to the receiver groups having receivers with good channel conditions.

3. A method according to claim 1, further comprising the step of assigning receivers in a receiver group slots in the slot group allocated to the receiver group.

4. A method according to claim 3, wherein more slots are assigned to receivers with better channel conditions.

5. A method according to claim 1, wherein the channel condition is indicated by any one of SIR, SNIR, SNR, CI, E/N, FER, BER and DRC.

6. A method according to claim 1, wherein the receivers are grouped based on statistically predicted signal reception conditions.

7. A method according to claim 1, wherein the TDMA channel is implemented on a CDMA channel.

8. A method according to claim 1, wherein the receivers are grouped in an equal number.

9. A method according to claim 1, wherein the receivers are grouped based on threshold levels of channel condition.

10. A method according to claim 8, wherein at least one of an upper and lower threshold levels defining a group is changed to try to keep constant the number of receivers in the group.

11. A method according to claim 8, wherein at least one of an upper and lower threshold levels defining a group is changed to try to keep constant an average of the signal reception conditions of the receivers in the group.

12. A method according to claim 1, wherein as a number of receivers in a group increases or decreases, more or less slots are allocated to the group.

13. A method according to claim 1, wherein when a group becomes comprised only of receivers whose current channel conditions are lower than a minimum channel condition, a slot that has been allocated to the group will be made an idle slot.

14. A method according to claim 1, wherein when a group becomes comprised only of receivers whose current channel conditions are lower than a minimum channel condition, a slot that has been allocated to the group will be reallocated to another group.

15. A method according to claim 1, wherein slots that have been allocated to a group are assigned more favorably to receivers in the group that require higher QoS.

16. A method according to claim 1, wherein the channel condition is measured at a receiver based on a pilot symbol received from the sender.

17. A method according to claim 1, wherein the channel condition is measured at the sender based on data received from a receiver.

18. A method according to claim 1, wherein a data rate for a receiver is adaptively changed according to the channel condition of the receiver.

19. A method according to claim 1, wherein data to be multicasted to a plurality of receivers in at least one group are not multicasted to the receivers unless all or most of the receivers have channel conditions higher than a predetermined multicast channel condition.

20. A method according to claim 1, wherein each receiver is notified of slots assigned thereto and puts itself in a sleep mode during timings of slots assigned to the other receivers.

* * * * *